(12) United States Patent
Kim et al.

(10) Patent No.: US 9,965,130 B2
(45) Date of Patent: May 8, 2018

(54) INPUT ERROR REMEDIATION

(75) Inventors: Seungil Kim, Seoul (KR); Changheon Lee, Goyang-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 723 days.

(21) Appl. No.: 13/701,349

(22) PCT Filed: May 11, 2012

(86) PCT No.: PCT/US2012/037494
§ 371 (c)(1),
(2), (4) Date: Nov. 30, 2012

(87) PCT Pub. No.: WO2013/169262
PCT Pub. Date: Nov. 14, 2013

(65) Prior Publication Data
US 2013/0305174 A1 Nov. 14, 2013

(51) Int. Cl.
*G06F 3/00* (2006.01)
*G06F 3/033* (2013.01)
*G06F 3/0481* (2013.01)
*G06F 3/048* (2013.01)
*G06F 3/0488* (2013.01)
*G06F 17/30* (2006.01)
*G06F 3/01* (2006.01)

(52) U.S. Cl.
CPC ............ *G06F 3/048* (2013.01); *G06F 3/0488* (2013.01); *G06F 17/3064* (2013.01); *G06F 17/30646* (2013.01); *G06F 17/30899* (2013.01); *G06F 3/002* (2013.01); *G06F 3/01* (2013.01)

(58) Field of Classification Search
CPC ............. G06F 3/00; G06F 3/033; G06F 3/048
USPC ................................. 715/863, 831, 715, 808
See application file for complete search history.

(56) References Cited

U.S. PATENT DOCUMENTS 5,119,079 A   6/1992  Hube et al.
5,627,567 A   5/1997  Davidson
(Continued)

FOREIGN PATENT DOCUMENTS

JP   2009093368 A   4/2009
KR   20090096998 A   9/2009

OTHER PUBLICATIONS

"IECE Trans. Commun., vol. E91-B, No. 5, May 2008, "A Generalizable Methodology for Quantifying User Satisfaction, by T. Huang, et al.
(Continued)

*Primary Examiner* — Doon Chow
*Assistant Examiner* — Le Nguyen
(74) *Attorney, Agent, or Firm* — Brundidge & Stanger, P.C.

(57) ABSTRACT

Technologies are generally described for an input error remediation scheme for an electronic device with a touch screen display. In some examples, a method performed under control of an electronic device with a touch screen display may include displaying a first page on the touch screen display, detecting a first input from a user of the electronic device, detecting a second input from the user; determining whether the first input is inadvertent based at least in part on the second input, and displaying a second page on the touch screen display, if the first input is determined to be inadvertent.

10 Claims, 8 Drawing Sheets

(56) References Cited

U.S. PATENT DOCUMENTS

| | | | | |
|---|---|---|---|---|
| 6,388,684 | B1* | 5/2002 | Iwamura | G09B 29/106 715/788 |
| 6,643,824 | B1* | 11/2003 | Bates et al. | 715/205 |
| 7,797,635 | B1* | 9/2010 | Denise | 715/738 |
| 2005/0071864 | A1* | 3/2005 | Denoue | H04N 21/40 725/9 |
| 2005/0177783 | A1* | 8/2005 | Agrawala | G06F 3/04883 715/230 |
| 2007/0250786 | A1 | 10/2007 | Jeon et al. | |
| 2008/0046809 | A1* | 2/2008 | Oshima et al. | 715/234 |
| 2008/0114599 | A1* | 5/2008 | Slotznick | G09B 5/06 704/260 |
| 2008/0165133 | A1* | 7/2008 | Blumenberg et al. | 345/173 |
| 2008/0295018 | A1* | 11/2008 | Nurmi | G06F 17/30899 715/780 |
| 2009/0046075 | A1 | 2/2009 | Kim et al. | |
| 2009/0228791 | A1 | 9/2009 | Kim et al. | |
| 2009/0303187 | A1* | 12/2009 | Pallakoff | 345/169 |
| 2010/0001953 | A1 | 1/2010 | Yamamoto et al. | |
| 2010/0066694 | A1* | 3/2010 | Jonsdottir | G06F 3/0236 345/173 |
| 2010/0066764 | A1 | 3/2010 | Refai et al. | |
| 2010/0088654 | A1 | 4/2010 | Henhoeffer | |
| 2010/0164879 | A1* | 7/2010 | Doktorova | G06F 3/0233 345/173 |
| 2010/0169834 | A1* | 7/2010 | Wakizaka | G06F 3/04817 715/821 |
| 2010/0194703 | A1* | 8/2010 | Fedor et al. | 345/173 |
| 2010/0241507 | A1* | 9/2010 | Quinn | G06Q 30/02 705/14.42 |
| 2010/0281408 | A1* | 11/2010 | Fujioka | G06F 3/04817 715/765 |
| 2011/0018812 | A1 | 1/2011 | Baird | |
| 2011/0050630 | A1 | 3/2011 | Ikeda | |
| 2011/0126087 | A1* | 5/2011 | Aust | G06F 17/30873 715/206 |
| 2011/0131479 | A1* | 6/2011 | Padgett | G06F 3/04895 715/223 |
| 2011/0148787 | A1 | 6/2011 | Kim | |
| 2011/0157053 | A1 | 6/2011 | Webb et al. | |
| 2011/0191685 | A1* | 8/2011 | Bamford et al. | 715/730 |
| 2011/0197158 | A1 | 8/2011 | Tseng et al. | |
| 2011/0201387 | A1 | 8/2011 | Paek et al. | |
| 2011/0202836 | A1 | 8/2011 | Badger et al. | |
| 2011/0254776 | A1 | 10/2011 | Elizarov et al. | |
| 2011/0288913 | A1* | 11/2011 | Waylonis | G06Q 30/0241 705/14.4 |
| 2011/0302488 | A1* | 12/2011 | Lee | G06F 3/0481 715/243 |
| 2012/0075223 | A1* | 3/2012 | Yamashita | G06F 3/0482 345/173 |
| 2012/0084705 | A1* | 4/2012 | Lee et al. | 715/776 |
| 2012/0169613 | A1* | 7/2012 | Armstrong | G06F 3/04886 345/173 |
| 2012/0169775 | A1* | 7/2012 | Woo | G06F 3/017 345/661 |
| 2013/0047100 | A1* | 2/2013 | Kroeger | G06F 3/0488 715/760 |
| 2013/0067420 | A1* | 3/2013 | Pittappilly | G06F 3/0236 715/863 |
| 2013/0086530 | A1* | 4/2013 | Gandhi | 715/862 |
| 2013/0147834 | A1* | 6/2013 | Yoshimoto | G01C 21/367 345/629 |
| 2013/0293572 | A1* | 11/2013 | Kodimer | G06F 3/04883 345/629 |
| 2013/0305174 | A1* | 11/2013 | Kim et al. | 715/765 |
| 2014/0337805 | A1* | 11/2014 | Shimoharada | G06F 3/0482 715/863 |

OTHER PUBLICATIONS

International Search Report and Written Opinion from International Application No. PCT/US2012/37494 dated May 11, 2012.
"Eyes-free Text Entry with Error Correction on Touchscreen Mobile Devices" by H. Tinwala, et al., pp. 1-20., (2010), Proceedings of the Sixth Nordic Conference on Human-Computer Interaction-NordiCHI 2010, 511-520.

* cited by examiner

INPUT ERROR REMEDIATION

CROSS-REFERENCE TO RELATED APPLICATION

This Application is a U.S. National Stage filing under 35 U.S.C. § 371 of International Application No. PCT/US12/37494, entitled "INPUT ERROR REMEDIATION," filed on May 11, 2012. The disclosure of International Application No. PCT/US12/37494 is incorporated herein by reference in its entirety.

BACKGROUND

Handheld devices such as smartphones, mobile phones, personal digital assistants (PDAs), tablets and mobile game consoles, etc., increasingly employ touch screens. Due to the small size of the touch screens, users of the handheld devices often experience pointing errors or input errors when they try to select one of links in a page displayed on the touch screens. Such errors significantly harm user experience.

SUMMARY

In an example, a method performed under control of an electronic device with a touch screen display may include displaying a first page on the touch screen display, detecting a first input from a user of the electronic device, detecting a second input from the user; determining whether the first input is inadvertent based at least in part on the second input, and displaying a second page on the touch screen display, if the first input is determined to be inadvertent.

In another example, an electronic device with a touch screen display may include a displaying unit configured to display a page on the touch screen display, a touch detection unit configured to detect at least first and second touch inputs on the touch screen display, and a determination unit configured to determine whether the first touch is inadvertent based at least in part on the second touch.

In yet another example, a computer-readable storage medium may store thereon computer-executable instructions that, in response to execution, cause an electronic device with a touch screen display to perform operations, including detecting an input error of a touch on a page displayed on the touch screen display, based at least in part on a behavior of a user, and modifying the displayed page in response to the detecting of the input error.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
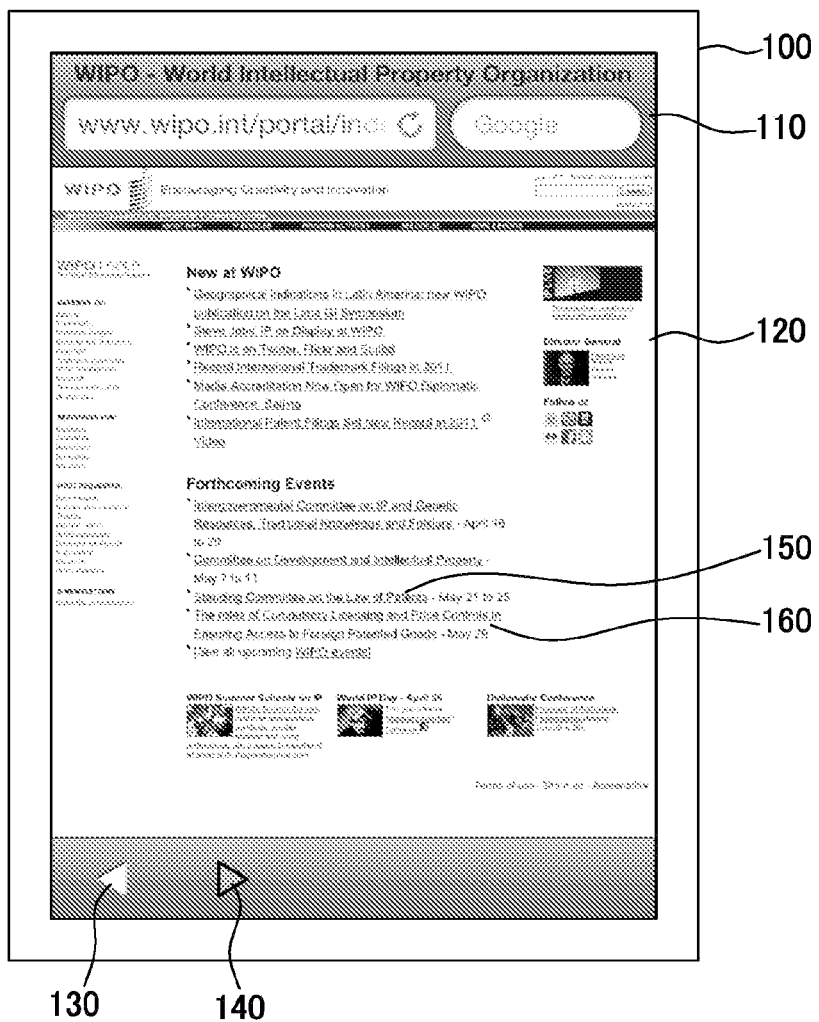
FIG. 1 schematically shows an illustrative example of an electronic device with a touch screen display displaying a page having one or more links to other pages, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an input error remediation scheme for an electronic device with a touch screen display.

Technologies are generally described for an electronic device with a touch screen display which may detect a touch input as well as display thereon contents such as a web page, an e-book, a document, etc. In some examples, the electronic device may detect an input error of the touch input on a page displayed on the touch screen display, based at least in part on user behavior. In some examples, the user behavior that indicates an input error may include canceling a command associated with the touch input within a predetermined time period after the touch input concludes. In some examples, the electronic device may detect the input error when the user touches a backward button, which may be associated with a command of going back to a previous page, within a predetermined time period after the touch input concludes. Alternatively, in some examples, the electronic device may detect the input error when the user touches an error button displayed on the touch screen display.

In some examples, upon detecting the input error, the electronic device may modify the displayed page, i.e., display a modified version of the page. In some other examples, the electronic device may enlarge at least a portion of the displayed page in a vicinity of the touch input, and display an enlargement of the portion on the touch screen display. Alternatively, in some further examples, the electronic device may display a pop-up window of the enlargement of the portion on the touch screen display. Optionally, in some examples, the electronic device may reduce a size and/or change a color of an object associated with the input error, i.e., an object which the user selects inadvertently, so that the user may select an intended object more easily in the modified version of the page. Optionally, in some examples, the electronic device may enlarge sizes and/or change colors of nearby objects which locate adjacent to the object associated with the input error, so that the user may select the intended object more easily in the modified version of the page.

FIG. 1 schematically shows an illustrative example of an electronic device with a touch screen display displaying a page having one or more links to other pages, arranged in accordance with at least some embodiments described herein.

As depicted in FIG. 1, an electronic device 100 may include a touch screen display 110. Examples of electronic device 100 may include, but are not limited to, a smartphone, a mobile phone, a personal digital assistant (PDA), a tablet, a mobile game console, and any other devices having a touch screen display. Examples of touch screen display 110 may include, but are not limited to, a capacitive touch screen, a resistive touch screen, a surface acoustic wave touch screen, an infrared touch screen, an optical imaging touch screen, an acoustic pulse recognition touch screen, and so on.

In some embodiments, touch screen display 110 may display thereon a page 120, and one or more buttons including a backward button 130 and a forward button 140, etc. By way of example, but not limitation, page 120 may include a page on a web browser (i.e., a web page), a page from an e-book, a page on any type of document, and so on. In some alternative embodiments, electronic device 100 may provide the one or more buttons as physical and/or touch-based buttons separate from touch screen display 110.

In some embodiments, page 120 may have one or more links to other pages. For instance, in the example illustrated in FIG. 1, page 120 may have a link 150 denoted by "Standing Committee on the Law of Patents" and a link 160 denoted by "The roles of Compulsory Licensing and Price Controls in Ensuring Access to Foreign Patented Goods."

In some embodiments, when a user of electronic device 100 intends to select link 150 but touches link 160 inadvertently, the user may touch backward button 130 shortly to cancel movement to a page associated with link 160, return to page 120 and try to touch link 150 again. Based at least in part on such a user behavior, in some embodiments, electronic device 100 may detect an input error, that is, determine the touch on link 160 to be inadvertent.

In some embodiments, electronic device 100 may determine that the touch on link 160 is inadvertent when a time interval between the detecting of the touch on link 160 and the detecting of the touch on backward button 130 is less than a predetermined amount of time. By way of example, but not limitation, the predetermined amount of time may be associated with statistics on human reaction time. Further by way of example, but not limitation, the predetermined amount of time may be configurable based at least in part on the user's preferences or abilities.

In some embodiments, electronic device 100 may determine that the touch on link 160 is inadvertent when the detecting of the touch on backward button 130 occurs before loading of the page associated with link 160 is completed.

Figure 2:
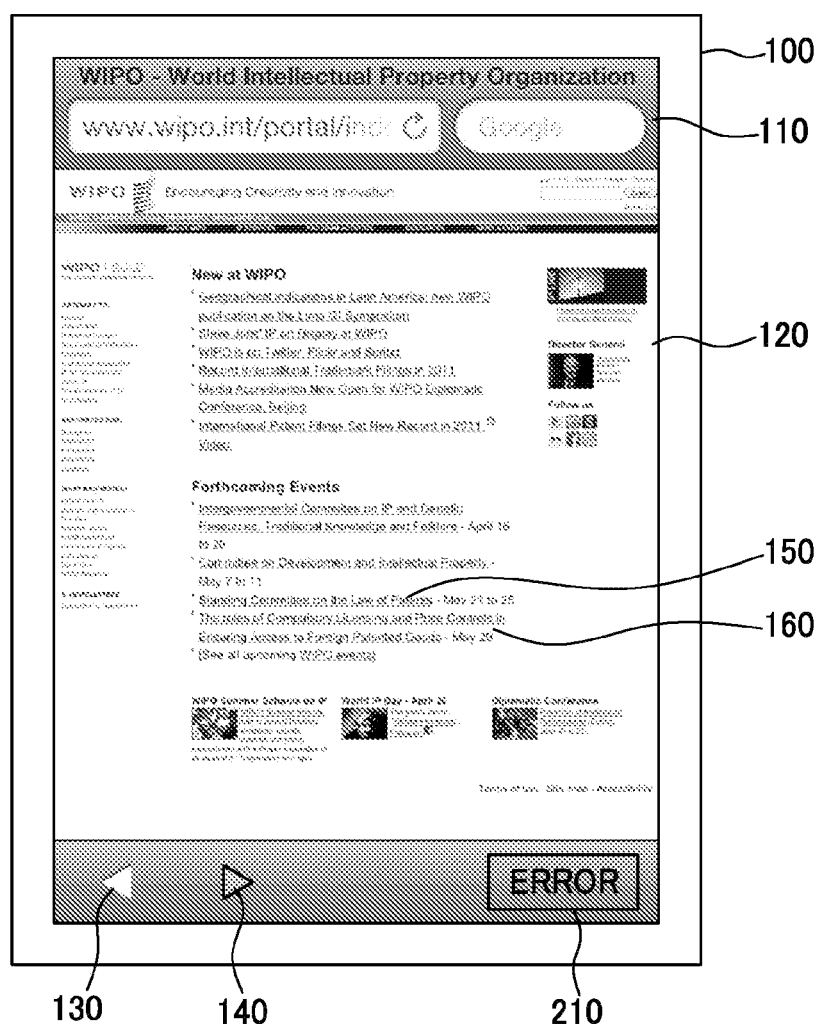
FIG. 2 schematically shows another illustrative example of an electronic device with a touch screen display displaying a page having one or more links to other pages, arranged in accordance with at least some embodiments described herein.

FIG. 2 schematically shows another illustrative example of an electronic device with a touch screen display displaying a page having one or more links to other pages, arranged in accordance with at least some embodiments described herein.

As depicted in FIG. 2, touch screen display 110 may further display thereon an error button 210. In some embodiments, when a user of electronic device 100 intends to select link 150 but touches link 160 inadvertently, the user may touch error button 210. Then, electronic device 100 may determine that the touch on link 160 is inadvertent.

Figure 3:
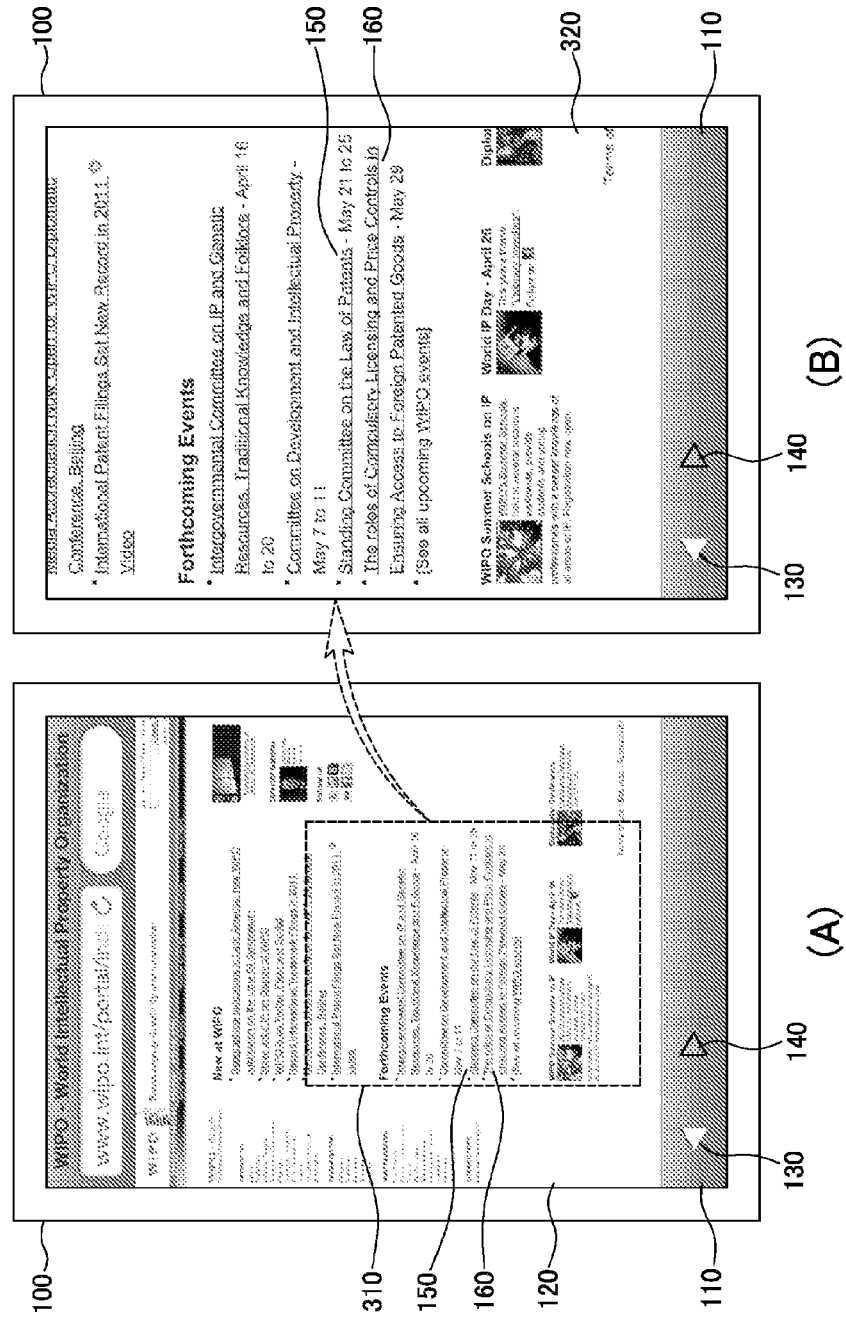
FIG. 3 schematically shows an illustrative example of an electronic device with a touch screen display displaying a modified version of a page when detecting an inadvertent touch on the touch screen display, arranged in accordance with at least some embodiments described herein.

FIG. 3 schematically shows an illustrative example of an electronic device with a touch screen display displaying a modified version of a page when detecting an inadvertent touch on the touch screen display, arranged in accordance with at least some embodiments described herein.

In the embodiments illustrated in FIG. 3(A), it may be assumed that a user intends to touch link 150 displayed in page 120, but inadvertently touches link 160 instead of link 150, and when the user notices an input error, he/she immediately touches backward button 130 to cancel movement to a page associated with link 160 to return to page 120. In such cases, electronic device 100 may detect a first touch at a location of link 160 on touch screen display 110, and detect a second touch at a location of backward button 130 on touch screen display 110.

In some embodiments, when a time interval between the detecting of the first touch and the detecting of the second touch is less than a predetermined amount of time, electronic device 100 may determine that the first touch is inadvertent. In some embodiments, when the detecting of the second touch occurs before a command associated with the first touch is completed, e.g., the detecting of the second touch occurs before loading of the page associated with link 160 is completed, electronic device 100 may determine that the first touch is inadvertent.

In some alternative embodiments in which error button 210 as illustrated in FIG. 2 is provided or displayed on touch screen display 110, the user may touch error button 210 when noticing an input error. In such cases, electronic device 100 may detect the second touch at a location of error button 210, and may determine that the first touch is inadvertent after the second touch at the location of error button 210 has been detected.

In some embodiments, when electronic device 100 determines the first touch to be inadvertent, electronic device 100 may enlarge at least a portion 310 of page 120 in a vicinity of the first touch, and display the enlarged portion 310 as a page 320 on touch screen display 110, as illustrated in FIG. 3(B). By way of example, but not limitation, portion 310 may be a section of page 120 on which the first touch is made. Further by way of example, but not limitation, the vicinity of the first touch may include a predetermined area of page 120 with the location of the first touch as a center. In some embodiments, the predetermined area of page 120 may be reconfigured by the user.

In some embodiments, electronic device 100 may reduce a size and/or change a color of link 160 in page 320, so as to help the user avoiding the same input error. Alternatively, electronic device 100 may enlarge sizes of and/or change colors of at least some of other links than link 160 in page 320.

As such, electronic device 100 may enable the user to select an intended link, e.g., link 150, more easily in the modified version of page 120, e.g., page 320.

Figure 4:
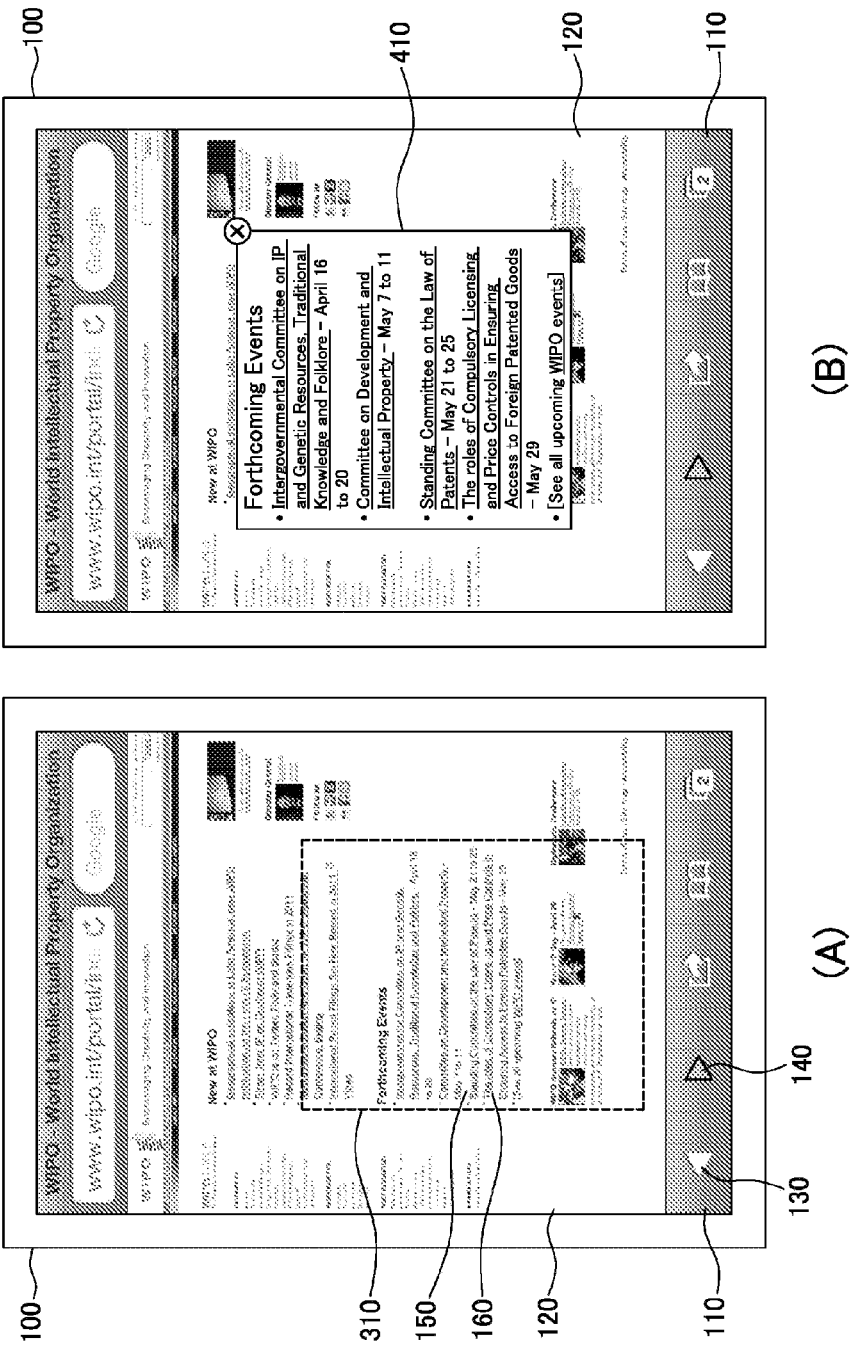
FIG. 4 schematically shows another illustrative example of an electronic device with a touch screen display displaying a modified version of a page when detecting an inadvertent touch on the touch screen display, arranged in accordance with at least some embodiments described herein.

FIG. 4 schematically shows another illustrative example of an electronic device with a touch screen display displaying a modified version of a page when detecting an inadvertent touch on the touch screen display, arranged in accordance with at least some embodiments described herein.

In the embodiments illustrated in FIG. 4(A), it may be assumed that electronic device 100 may detect a first touch at a location of link 160 on touch screen display 110, and detect a second touch at a location of backward button 130 (alternatively, error button 210) on touch screen display 110, in the same manner as illustrated above with reference to FIG. 3. In some embodiments, when electronic device 100 determines the first touch to be inadvertent, in a similar way as illustrated above with reference to FIG. 3, electronic device 100 may enlarge at least a portion 310 of page 120 in a vicinity of the first touch, and display the enlarged portion as a pop-up window 410 on touch screen display 110, as illustrated in FIG. 4(B). By way of example, but not limitation, portion 310 may be a section of page 120 on which the first touch is made. Further by way of example, but not limitation, the vicinity of the first touch may include a predetermined area of page 120 with the location of the first touch as a center.

In some embodiments, electronic device 100 may dispose pop-up window 410 overlapped on page 120, as illustrated in FIG. 4(B). In some alternative embodiments, electronic device 100 may downsize page 120, and display the downsized version of page 120 and pop-up window 410 on touch screen display 110, in such a manner that pop-up window 410 is not overlapped with the downsized version of page 120.

In some embodiments, electronic device 100 may reduce a size and/or change a color of link 160 in pop-up window 410, so as to help the user avoid the same input error. Alternatively, electronic device 100 may enlarge sizes of and/or change colors of at least some of other links than link 160 in pop-up window 410.

As such, electronic device 100 may enable the user to select an intended link, e.g., link 150, more easily in the modified version of page 120, e.g., pop-up window 410.

Figure 5:
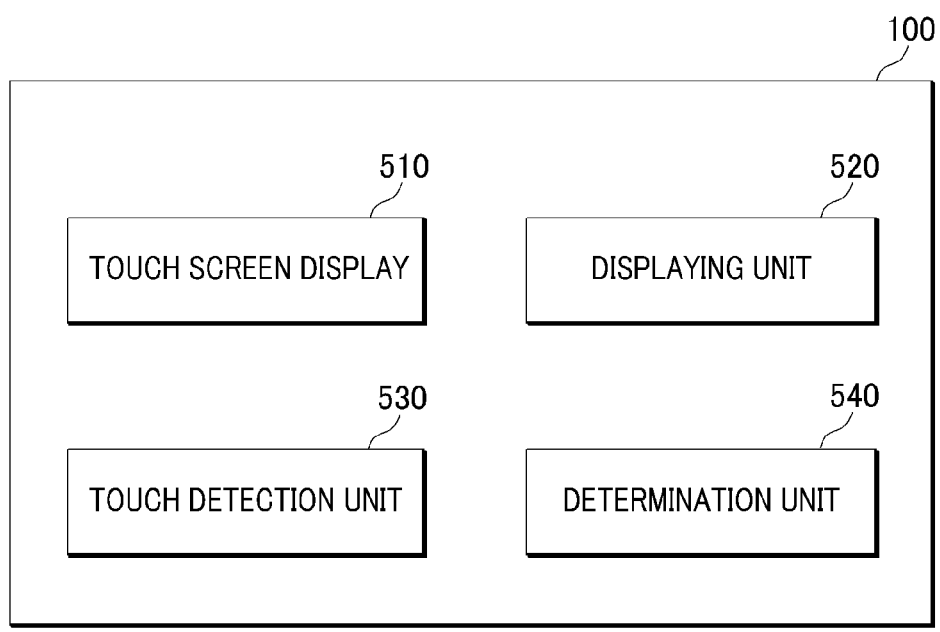
FIG. 5 shows a schematic block diagram illustrating an example architecture of an electronic device for providing an input error remediation scheme, arranged in accordance with at least some embodiments described herein.

FIG. 5 shows a schematic block diagram illustrating an example architecture of an electronic device for providing an input error remediation scheme, arranged in accordance with at least some embodiments described herein.

As depicted, electronic device 100 may include a touch screen display 510, a displaying unit 520, a touch detection unit 530 and a determination unit 540. Although illustrated as discrete components, various components may be divided into additional components, combined into fewer components, or eliminated altogether while being contemplated within the scope of the disclosed subject matter.

Touch screen display 510 may be configured to display contents thereon based at least in part on signals from displaying unit 520, and make touch detection unit 530 detect touch inputs when a user of electronic device 100 touches touch screen display 510. Examples of touch screen display 510 may include, but are not limited to, a capacitive touch screen, a resistive touch screen, a surface acoustic wave touch screen, an infrared touch screen, an optical imaging touch screen, an acoustic pulse recognition touch screen, and so on.

Displaying unit 520 may be configured to display at least a first page on touch screen display 510. Touch detection unit 530 may be configured to detect at least first and second touch inputs on touch screen display 510. Determination unit 540 may be configured to determine whether the first touch is inadvertent based at least in part on the second touch.

In some embodiments, when the second touch is associated with a command to cancel a command associated with the first touch, and a time interval between touch detection unit 530 detecting the first touch and detecting the second touch is less than a predetermined amount of time, determination unit 540 may determine the first touch to be inadvertent.

In some embodiments, when the second touch is associated with a command to cancel a command associated with the first touch, and touch detection unit 530 detects the second touch before electronic device 100 completes the command associated with the first touch, determination unit 540 may determine the first touch to be inadvertent.

In some embodiments, when the second touch is a touch on an error button displayed on touch screen display 510, determination unit 540 may determine the first touch to be inadvertent.

In some embodiments, when determination unit 540 determines the first touch to be inadvertent, displaying unit 520 may display a second page, which may be a modified version of the first page, on touch screen display 510. In some embodiments, the second page may include an enlargement of a portion of the first page in a vicinity of the first touch. In some embodiments, displaying unit 520 may display the second page instead of the first page. In some alternative embodiments, displaying unit 520 may display both of the first page and the second page simultaneously. By way of example, but not limitation, displaying unit 520 may display the second page as a pop-up window disposed on the first page.

In some embodiments, displaying unit 520 may, in the second page, reduce a size and/or change a color of an object associated with a link selected based on the first touch. In some alternative embodiments, displaying unit 520 may, in the second page, enlarge sizes and/or change colors of other objects than the object associated with the link selected based on the first touch. In some alternative embodiments, displaying unit 520 may, in the second page, enlarge sizes and/or change colors of objects which locate adjacent to the object associated with the link selected based on the first touch.

As such, electronic device 100 may increase sizes of objects associated with relevant links in the second page, thereby helping the user avoiding the same input error.

Figure 6:
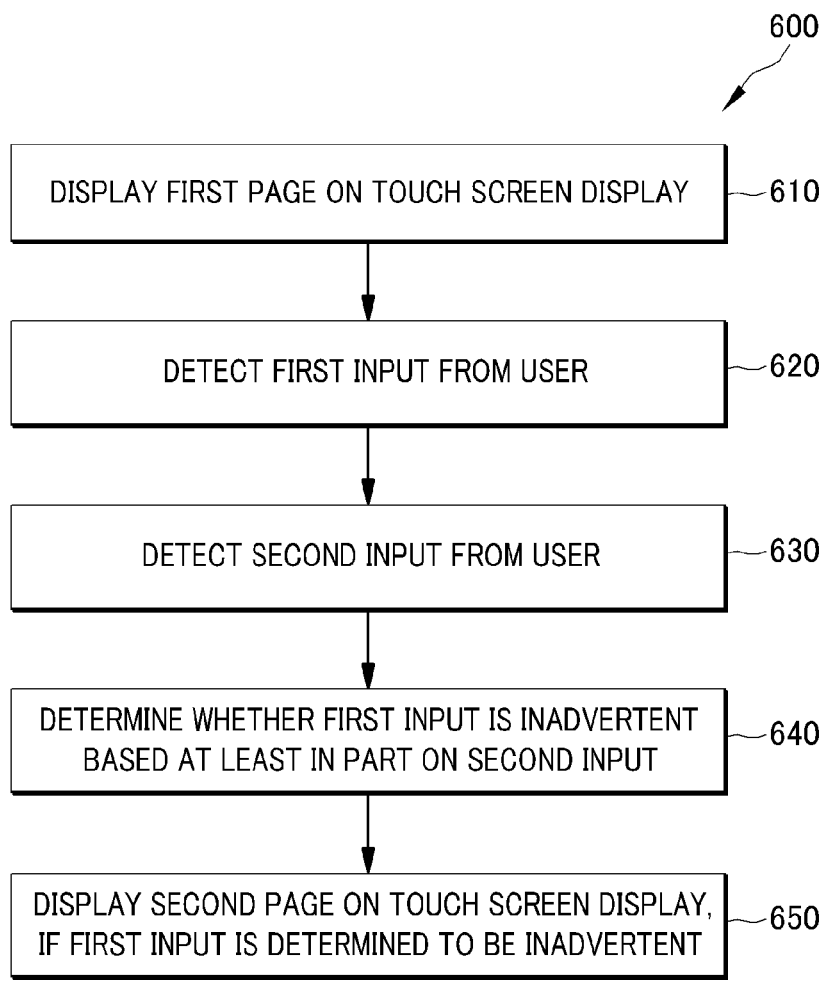
FIG. 6 shows an example flow diagram of a process for providing an input error remediation scheme for an electronic device with a touch screen display, arranged in accordance with at least some embodiments described herein.

FIG. 6 shows an example flow diagram of a process for providing an input error remediation scheme for an electronic device with a touch screen display, arranged in accordance with at least some embodiments described herein.

The process in FIG. 6 may be implemented in an electronic device with a touch screen display, such as electronic device 100 including touch screen display 510, displaying unit 520, touch detection unit 530 and determination unit 540 described above. An example process 600 may include one or more operations, actions, or functions as illustrated by one or more blocks 610, 620, 630, 640 and/or 650. Although illustrated as discrete blocks, various blocks may be divided into additional blocks, combined into fewer blocks, or eliminated, depending on the desired implementation. Processing may begin at block 610.

At block 610 (Display First Page on Touch Screen Display), the electronic device may display a first page on the touch screen display. In some embodiments, the first page may have one or more links to other pages. Processing may continue from block 610 to block 620.

At block 620 (Detect First Input from User), the electronic device may detect a first input from a user of the electronic device. In some embodiments, the first input may be a touch input associated with selecting one of the one or more links in the first page. Processing may continue from block 620 to block 630.

At block 630 (Detect Second Input from User), the electronic device may detect a second input from the user. In some embodiments, the second input may be associated with a command to cancel a command associated with the first input. In some embodiments, the second input may be associated with returning to the first page. In some embodiments, the second input may be a touch on an error button displayed on the touch screen display. Processing may continue from block 630 to block 640.

At block 640 (Determine Whether First Input is Inadvertent Based At Least in Part on Second Input), the electronic device may determine whether the first input is inadvertent based at least in part on the second input. In some embodiments, when the second input is associated with canceling the command associated with the first input, and a time interval between the detecting of the first input and the detecting of the second input is measured to be less than a predetermined amount of time, the electronic device may determine the first input to be inadvertent. In some embodiments, when the second input is associated with canceling the command associated with the first input, and the detecting of the second input occurs before the command associated with the first input is completed, the electronic device may determine the first input to be inadvertent. In some embodiments, when the second input is the touch on the error button displayed on the touch screen display, the electronic device may determine the first input to be inadvertent after the second input has been detected. Processing may continue from block 640 to block 650.

At block 650 (Display Second Page on Touch Screen Display if First Input is Determined to be Inadvertent), the electronic device may display a second page on the touch screen display, if determining the first input to be inadvertent. In some embodiments, the second page may include a portion of the first page, which may be in a vicinity of the first input. In some embodiments, the electronic device may display, on the touch screen display, the second page instead of the first page. In some alternative embodiments, the electronic device may display both of the first page and the second page simultaneously on the touch screen display.

In some embodiments, the electronic device may, in the second page, reduce a size and/or change a color of an object associated with a link selected based on the first input. In some alternative embodiments, the electronic device may, in the second page, enlarge sizes and/or change colors of other objects than the object associated with the link selected based on the first input. In some alternative embodiments, the electronic device may, in the second page, enlarge sizes and/or change colors of objects which locate adjacent to the object associated with the link selected based on the first input.

As such, the electronic device may help the user avoiding the same input error as committed previously in the first page.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
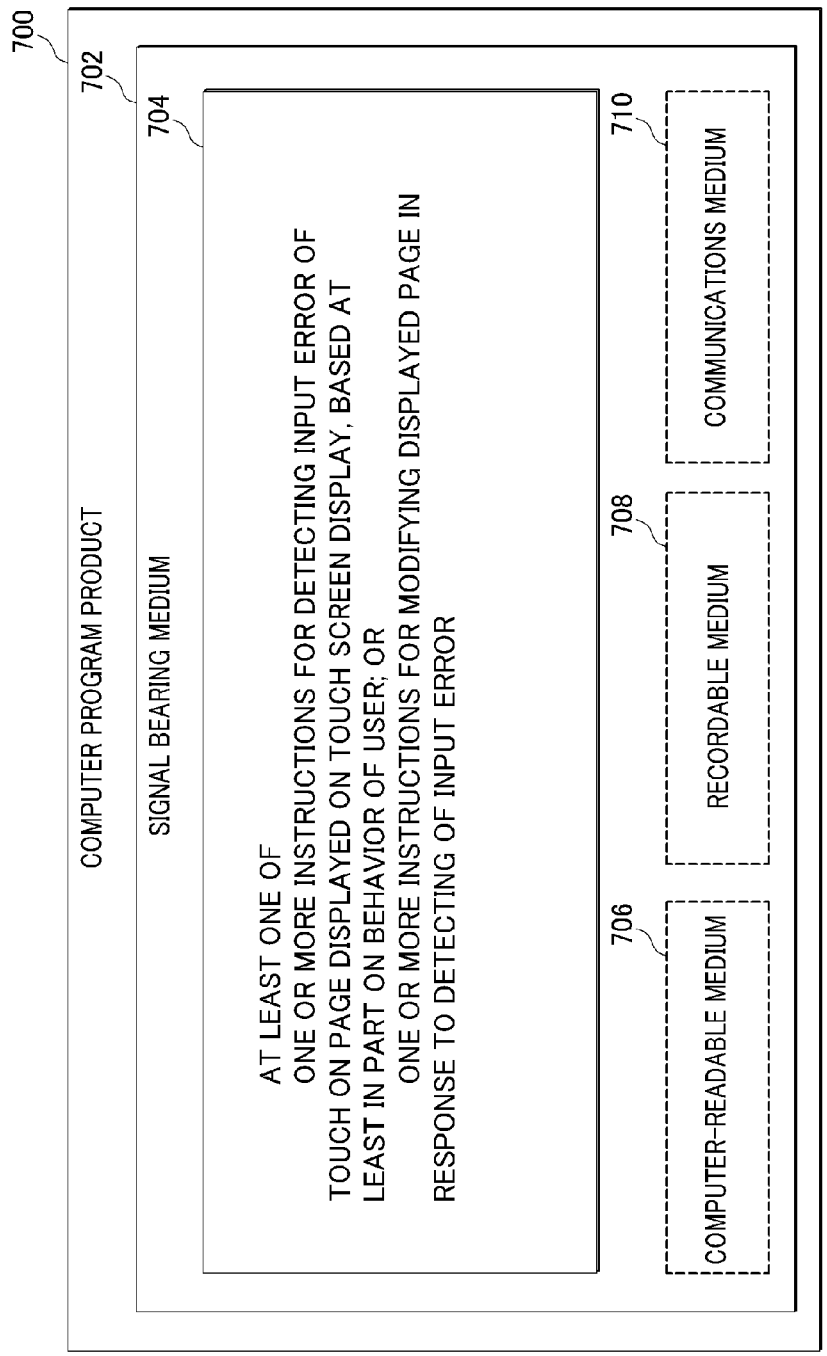
FIG. 7 illustrates example computer program products that may be utilized to provide an input error remediation scheme for an electronic device with a touch screen display, arranged in accordance with at least some embodiments described herein.

FIG. 7 illustrates example computer program products that may be utilized to provide an input error remediation scheme for an electronic device with a touch screen display, arranged in accordance with at least some embodiments described herein.

Program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for detecting an input error of a touch on a page displayed on the touch screen display, based at least in part on a behavior of a user; one or more instructions for modifying the displayed page in response to the detecting of the input error. Thus, for example, referring to FIG. 5, electronic device 100 may undertake one or more of the blocks shown in FIG. 6 in response to instructions 704.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of electronic device 100 by an RF signal bearing medium 702, where the signal bearing medium 702 is conveyed by a wireless communications medium 710 (e.g., a wireless communications medium conforming with the IEEE 802.11 standard).

Figure 8:
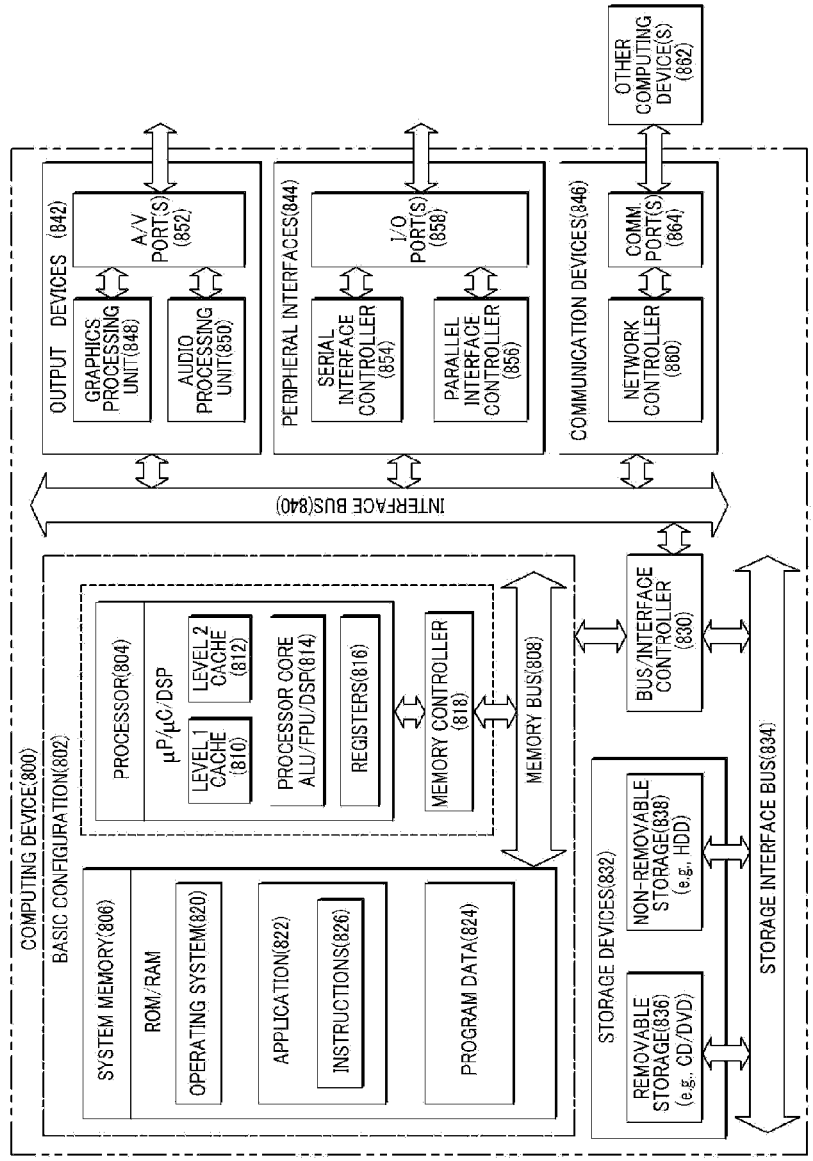
FIG. 8 is a block diagram illustrating an example computing device that may be utilized to provide an input error remediation scheme for an electronic device with a touch screen display, arranged in accordance with at least some embodiments described herein.

FIG. 8 is a block diagram illustrating an example computing device that may be utilized to provide an input error remediation scheme for an electronic device with a touch screen display, arranged in accordance with at least some embodiments described herein.

In these examples, elements of computing device 800 may be arranged or configured for an electronic device. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include instructions 826 that may be arranged to perform the functions as described herein including the actions described with respect to the electronic device 100 architecture as shown in FIG. 5 or including the actions described with respect to the flow charts shown in FIG. 6. In some examples, application 822 may be arranged to operate with program data 824 on an operating system 820 such that implementations for instructions for an electronic device as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electronic device that includes a touch screen display, the electronic device comprising:
   a display unit configured to display a page on the touch screen display, wherein the page displays objects that include links to other pages;
   a touch detection unit configured to detect at least a first touch and a second touch on the touch screen display, wherein the first touch includes a selection of a link of the links; and
   a determination unit configured to determine that the first touch is inadvertent in response to a determination that the second touch is associated with a command to cancel a command associated with the first touch and that a time interval between the touch detection unit having detected the first touch and having detected the second touch is less than a particular amount of time, wherein:
      the display unit is further configured to, in response to the determination unit having determined that the first touch is inadvertent, display a modified version of the page on the touch screen display,
      the modified version of the page includes a pop-up window that includes the selected link and at least one link other than the selected link,
      the modified version of the page includes a downsized version of the displayed page, and
      the display of the modified version of the page includes a display of the pop-up window and the downsized version of the displayed page.

2. The electronic device of claim 1, wherein the determination unit is further configured to determine that the first touch is inadvertent when the touch detection unit detects the second touch before the electronic device completes the command associated with the first touch.

3. The electronic device of claim 1, wherein the pop-up window includes a section of the displayed page on which the first touch is made.

4. The electronic device of claim 1, wherein the pop-up window includes an area of the displayed page with the first touch as a center.

5. The electronic device of claim 1, wherein the pop-up window is non-overlapping with the downsized version of the displayed page.

6. A method performed under control of an electronic device that includes a touch screen display, the method comprising:
   displaying a first page on the touch screen display, wherein the first page displays includes objects that include links to other pages;
   detecting at least a first touch and a second touch on the touch screen display, wherein the first touch includes a selection of a link of the links;
   determining that the first touch is inadvertent in response to determining that the second touch is associated with a command to cancel a command associated with the first touch and that a time interval between the detecting the first touch and the detecting the second touch is less than a particular amount of time; and
   in response to the determination that the first touch is inadvertent, displaying a second page on the touch screen display, wherein the second page includes a modified version of the first page, and wherein displaying the second page includes:

enlarging at least a portion of the first page in a vicinity of the first touch, wherein the enlarged at least the portion includes at least one object other than the selected link, reducing at least another portion of the first page in the vicinity of the first touch, wherein the reduced at least the another portion includes the selected link, and wherein the selected link is associated with the first touch that is determined to be inadvertent, and displaying the second page that includes the enlarged at least the portion and the reduced at least the another portion on the touch screen display, wherein displaying the second page includes displaying the second page disposed as a pop-up window on the first page, thereby displaying the first page and the modified version of the first page as the second page simultaneously.

7. The method of claim 6, wherein the determining includes:

determining that the first touch is inadvertent when the second touch is detected before the electronic device completes the command associated with the first touch.

8. The method of claim 6, wherein the enlarged at least the portion includes a section of the first page on which the first touch is made.

9. The method of claim 6, wherein the vicinity of the first touch includes an area of the first page with the first touch as a center.

10. The method of claim 6, wherein the first page includes a web page and each of the links includes text.

* * * * *